Aug. 14, 1956

J. G. SQUIRES 2,758,342

PLASTIC MULLIONS

Filed May 17, 1952

*INVENTOR.*
JUDSON G. SQUIRES
BY Campbell, Brumbaugh, Free & Graves
HIS ATTORNEYS.

United States Patent Office 2,758,342
Patented Aug. 14, 1956

2,758,342
PLASTIC MULLIONS
Judson G. Squires, Omaha, Nebr.
Application May 17, 1952, Serial No. 288,504
2 Claims. (Cl. 20—40)

My invention relates to plastic mullions and the application thereof. More particularly, my invention relates to plastic mullions for application to glass surfaces to reduce the over-all exposed size of the panes and to minimize breakage as well as fragmentation and flying glass particles caused by the exposure of such glass surfaces to unusual pressures, explosions and blasts; and as a standard building trades item for all types of mullion work.

In considering what could be done to safeguard our people against atomic bombing attacks, my attention has centered on the great danger inherent in the millions of acres of sizeable full pane window glass and plate glass used in this country. The danger is due to the brittle nature of glass and resulting injuries will occur to persons struck by flying fragments of windows blasted out of their frames by bomb explosions, wind storms, and similar causes.

The anti-scatter treatment of glass has previously has considered, for example, in the U. S. Bureau of Standards publication M-175. It has been proposed, for example, to coat the entire surface of glass with lacquer. The application of lacquer is difficult especially for the inexpert and upon aging is apt to obscure the clarity of the glass. It has also been proposed to apply tapes to the glass, but none of the tapes suggested heretofore gave satisfactory results when applied in patterns to cover only a part of the glass. Nor did they present a lastingly pleasing or non-disfiguring appearance when so applied.

I have discovered that if plastic material is shaped in suitable proportions and made of unusual strength such as by reinforcing with fibrous glass, the resultant product can be applied to the glass surfaces as mullions with advantages over conventional mullions and at the same time reinforce the glass and resist breakage and shattering that might otherwise be caused by percussive forces.

It is an object of my invention to provide plastic mullions that will present an attractive appearance and can be permanently attached to glass panes to give the safety above referred to without adversely detracting from the appearance of the glass. More particularly, it is an object of my invention to provide plastic mullions which in use will resemble and will supply all if not more of the advantages of leaded glass panes or glass panes mullioned with aluminum, stainless steel, wood or other materials, and at decided savings in scarce materials, labor and time, as compared with the production and installation of presently used conventional mullion work.

Other objects and advantages of my invention will become apparent from the following description taken in conjunction with the drawings in which.

The mullion generally illustrated at 5 may be formed of any suitable flexible plastic material. It may be opaque or translucent depending upon the plastic and upon the pigments or other components of the plastic. Alternatively, it may be transparent so as to have the same light transmitting characteristics as the window pane to which it is to be applied. The translucent and transparent mullions may be colored or colorless, and the opaque mullions may have any shade or color.

The mullion may be formed from conventional flexible plastics. Such plastics may be flexible, for example, the polyvinyl chloride resins, polyvinyl chloride-acetate copolymer resins, polyester resins, polystyrene resins, polyethylene resins, polymononchlorotrifluoroethylene resins, arcylate and methacrylate resins, polyamide (nylon) resins, cellulose acetate resins, chlorinated rubber, and similar materials. These may be plasticized to the extent desirable for flexing handling. The thermosetting plastics such as phenol-formaldehyde, phenol-furfural, urea-formaldehyde and similar resins are more difficult to plasticize for flexibility, but to the extent that they may be plasticized, they are suitable for use. Conventional plasticizers such as adipates, tricresyl phosphate, phthalate esters, sebacate esters, etc., may be used as plasticizers. If the plastic is to simulate wood, lead, stainless steel, aluminum, bronze or other materials, pigments may be incorporated to give the desired external appearance. Alternatively, the composition of the plastic may be selected and modified to render it translucent as is well known in the art. If it is desired to make the plastic mullion transparent, the refractive index of the plastic should be the same as the reinforcing agent as is known in the art. Transparent coloring materials can be included in the translucent and transparent plastic.

Figure 3:
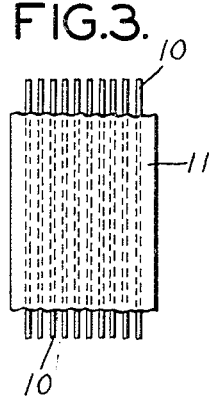
Figure 3 is an enlarged fragmentary sectional view showing the plastic mullion.
Figure 4:
Figure 4 is an enlarged cross-sectional view of the plastic mullion shown in Figure 3.

In one of the preferred forms of the invention fibrous glass strands 10 extending parallel with the length of the plastic mullion are imbedded in the plastic 11, as indicated in Figures 3 and 4. If desired, fibrous glass can be used which is readily available in the form of yarn or strands. Alternatively, the glass fibers may be imbedded in the plastic in the form of roving. Woven fabrics of fibrous glass, especially strong in the lengthwise direction, are also suitable.

The combination of the flexible plastic reinforced in at least the lengthwise direction with fibrous glass provides a mullion which is sufficiently flexible to be readily applied, but which nevertheless provides great strength so as to resist the breakage and the fragmentation and flying of the glass.

The plastic mullions can be readily made by the extrusion of the plastic with the fibrous glass imbedded internally therein, or by lamination of unidirectional fibrous glass cloth or fibrous glass yarn or roving with the desired plastics in sheets and the laminate cut to mullion shape.

The plastic mullions may be made in widths depending upon the type and size of glass to which it is to be applied. Widths varying from about ½ to 3 inches are generally suitable, generally from ½ to 1 inch for the panes such as ordinary household double hung windows. The plastic mullions may vary from about 1/32 to 1/8 inch, in thickness, and in some instances up to about 1/5 inch, depending upon the length and width of the mullion to be applied.

The amount of the reinforcing fibrous glass within the plastic mullion depends somewhat on the size of the glass to which it is to be applied and the necessary strength of the mullion. In a plastic mullion having a thickness of 1/16 of an inch and about 7/8 inch wide, about 8 to 16 strands of fibrous glass yarns (of a diameter such that a strand 15,000 yards long weighs one pound) extending parallel to the length of the mullion may be included.

The plastic mullion preferably is applied to the inside of the window although it may be applied to both the inside and the outside. When applied to the inside, assuming the pressure will come from the outside, the mullion assists in resisting flexure of the glass inwardly beyond its elastic limit and thus imparts strength as well as resistance to fragmentation and flying of glass.

Figure 1:
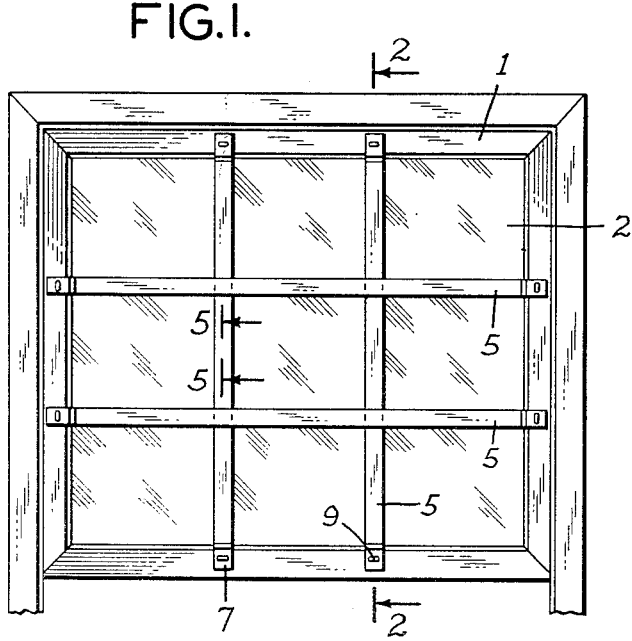
Figure 1 is a front elevation of a window pane having plastic mullions applied thereto.
Figure 2:
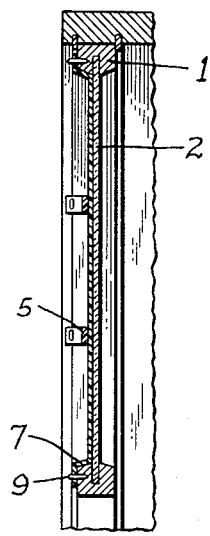
Figure 2 is a vertical sectional view taken along line 2—2 of Figure 1.

In Figures 1 and 2, the application of the mullions to half of a double hung window is illustrated. The window sash or equivalent frame 1 surrounds the glass pane 2. The plastic mullions 5 are applied to the large pane which reduces the pane into 9 effective panes. The mullions can be applied in various geometric shapes such as in triangles, stars, etc., in material of the same or different varieties and colors.

Figure 5:
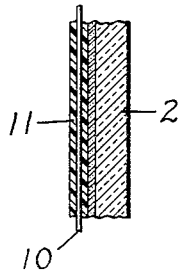
Figure 5 is an enlarged fragmentary detailed sectional view taken on line 5—5 of Figure 1 showing the plastic mullion applied with an adhesive.

The plastic mullion may be applied with any adhesive that will adhere tenaciously to glass and to plastic, as shown in Figure 5. The adhesive must set up with relative firmness as distinguished from adhesive which remain sticky and permit the mullion to give relative to the window and the frame. Generally, the adhesive will comprise a plastic in an appropriate evaporative solvent. Examples are the plastics mentioned heretofore in solvents such as ketones, alcohols, hydrocarbons, etc., as known in the art.

Figure 6:
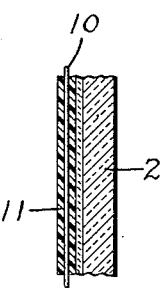
Figure 6 is an enlarged fragmentary detailed sectional view similar to Figure 5, except that the plastic mullion is applied with a solvent for the plastic.

Another mode of application is to apply a solvent for the plastic to one surface of the mullion. The solvent will soften the surface of the plastic mullion itself and render it adhesive so that it may be applied directly to the surface of the glass. The mullion so applied is illustrated in Figure 6.

Each plastic mullion is applied in a single piece of such length as to extend to the ends of the glass and preferably to extend over the frame as shown at 7. The plastic mullion can be secured to the frame by an adhesive or solvent as described heretofore, and/or by staples 9.

The mullions can be cut from a roll to the exact length and there is no wastage. The mullion can be readily applied by hand as strips or tapes or by means of a dispenser such as described in my application Serial No. 252,599, filed October 23, 1951, now Patent No. 2,717,709 granted September 13, 1955, of which this application is a continuation-in-part.

The amount of standing glass in the country in which the panes are relatively large presents a great breakage hazard. By means of my invention it is possible quickly and inexpensively to render this standing glass resistant to breakage and shattering and without detracting from the appearance thereof. With the mullions above described the appearance of the window may be greatly enhanced. For example, the mullions may be made in simulation of frosted glass or pastel colors to harmonize with a decorative scheme, as well as simulating metals, wood and other materials. The plastic mullions of the invention make it possible to convert windows so as to have the same appeal of ordinary mullioned windows and at the same time to secure broader decorative possibilities. As a result, the mullion of my invention, being durable, can be left secured to the glass so as to provide both continuing protection and pleasing appearance.

In extensive tests that I have made, I have established that plastic mullions made in accordance with my invention, when applied to glass which is subject to explosive forces, renders the glass resistant to breakage and shattering in a way that has not been possible with any of the means heretofore proposed or with which I am familiar. As far as I am aware, my invention supplies a practical, expeditious, and inexpensive method or means not heretofore or currently available or proposed, for producing the beneficial results detailed above; namely, as a means and a measure to civil protection or defense, and as a new and superior product and method for a commonly desired treatment of glass panes in both old and new structures.

While I have indicated a preference for fibrous glass as a reinforcement medium, it will be obvious that other materials may be the equivalent thereof and can be substituted therefor, or other equivalent means adopted to render the plastic material equally strong.

In the above description, it is suggested that plastic mullions can be applied to windows that are already standing. While I believe this would be one of the principal advantages of my invention, nevertheless, plastic mullions and windows with them can be used as a building trades item. In this embodiment of the invention, the mill or other fabricator of the windows can apply the mullions to the glass at the time the windows are manufactured. This imparts all of the advantages mentioned heretofore and in addition replaces scarce materials and eliminates the fitting, calking and other time-consuming operations involved in mullion work.

I claim:

1. A plastic mullion for application to a window pane, comprising a flat strip $\frac{1}{32}$ to $\frac{1}{8}$ of an inch in thickness, and $\frac{1}{2}$ to 3 inches in width, made of a flexible, strong plastic material, said strip being formed by shaping to the configuration and appearance of a conventional window mullion, said strip, further, being of very high and uniform tensile strength throughout its length to adequately reinforce the glass in the longitudinal direction of the strip when applied to glass, said plastic material being weather resistant to afford a relatively long life to the strip when applied to the glass pane, a decorative pigment embodied in said strip, and a coating of a pressure-sensitive adhesive, capable of adhering to the glass, applied to one side of the strip for applying the strip to the surface of a window pane.

2. A reinforced plastic mullion to the applied to a window pane, said plastic mullion having a configuration and appearance of an ordinary window mullion, comprising a flat flexible strip about $\frac{1}{16}$ of an inch in thickness, made of a synthetic plastic material, a decorative pigment embodied therein, a plurality of parallel, spacially separated reinforcing glass fibers embedded in said strip, each extending continuously throughout the length thereof, the ratio of the cross-sectional area of the reinforcing glass fibers to the total cross-sectional area of the strip being relatively low so that the strip will have the characteristics of the plastic material rather than the characteristics of the reinforcing glass fibers, said strip having from four to nine strands of glass fiber yarn substantially equally spaced from each other per one-half inch of width of the strip, the approximate diameter of the fiber strands being such that a strand 15,000 yards long weighs about one pound, and a coating of a pressure-sensitive adhesive, capable of adhering to the glass, applied to one side of the strip for applying the strip to the surface of a window pane.

References Cited in the file of this patent

UNITED STATES PATENTS

| | | |
|---|---|---|
| 2,176,837 | Ellis | Oct. 17, 1939 |
| 2,359,347 | Woodman | Oct. 3, 1944 |
| 2,408,281 | Wilkin | Sept. 24, 1946 |
| 2,422,969 | Johns | June 24, 1947 |
| 2,446,119 | White | July 27, 1948 |
| 2,549,661 | Carney | Apr. 17, 1951 |
| 2,571,372 | Martin | Oct. 16, 1951 |

FOREIGN PATENTS

| | | |
|---|---|---|
| 467,009 | Canada | Aug. 1, 1950 |

OTHER REFERENCES

Blackouts (booklet), pages 15 and 16, U. S. Office of Civilian Defense, Washington, D. C., August 1941. (Copy in Div. 33.)

Glass and Glass Substitutes (booklet), page 12, U. S. Office of Civilian Defense, Washington, D. C., November 1941. (Copy in Div. 33.)